(12) United States Patent
MacGregor et al.

(10) Patent No.: US 7,924,014 B2
(45) Date of Patent: *Apr. 12, 2011

(54) ELECTROMAGNETIC SURVEYING FOR HYDROCARBON RESERVOIRS

(75) Inventors: Lucy M. MacGregor, Edinburgh (GB); Martin C. Sinha, Southampton (GB)

(73) Assignee: OHM Limited, Aberdeen (GB)

( * ) Notice: Subject to any disclaimer, the term of this patent is extended or adjusted under 35 U.S.C. 154(b) by 252 days.

This patent is subject to a terminal disclaimer.

(21) Appl. No.: 12/252,797

(22) Filed: Oct. 16, 2008

(65) Prior Publication Data

US 2009/0043508 A1 Feb. 12, 2009

Related U.S. Application Data

(63) Continuation of application No. 10/554,236, filed as application No. PCT/GB2004/001877 on Apr. 30, 2004, now Pat. No. 7,659,721.

(30) Foreign Application Priority Data

Jun. 10, 2003 (GB) .................................. 0313376.6

(51) Int. Cl.
G01V 3/08 (2006.01)
(52) U.S. Cl. ..................... 324/337; 324/365; 324/334
(58) Field of Classification Search .................. 324/337, 324/365, 334
See application file for complete search history.

(56) References Cited

U.S. PATENT DOCUMENTS

| 4,258,322 | A | 3/1981 | Rocroi et al. |
| 5,905,657 | A | 5/1999 | Celniker |
| 5,955,884 | A | 9/1999 | Payton et al. |
| 7,659,721 | B2 * | 2/2010 | MacGregor et al. .......... 324/337 |
| 2003/0043692 | A1 | 3/2003 | Ellingsrud et al. |
| 2003/0048105 | A1 | 3/2003 | Ellingsrud et al. |

FOREIGN PATENT DOCUMENTS

| GB | 2 155 182 | 9/1985 |
| GB | 2 382 875 | 6/2003 |
| WO | 00/13046 | 3/2000 |
| WO | 02/14906 | 2/2002 |

* cited by examiner

Primary Examiner — Reena Aurora
(74) Attorney, Agent, or Firm — Renner, Otto, Boisselle & Sklar, LLP (57) ABSTRACT

A method of electromagnetic surveying of an area of seafloor that is thought or known to contain a subterranean hydrocarbon reservoir is described. The method includes broadcasting an EM signal from a horizontal electric dipole (HED) transmitter and obtaining vertical electric dipole (VED) response data at a remote receiver in response thereto. Survey data are analyzed by comparing the VED response data with background data which are not sensitive to the postulated hydrocarbon reservoir. Accordingly, differences between the VED response data and the background data allow for the identification of buried hydrocarbon reservoirs. The background data may be provided by magneto-telluric surveying, controlled source electromagnetic surveying or from direct geophysical measurement. By employing VED response data in this way, surveys may be performed in shallower water than has previously been possible since the VED detector is not sensitive to air-wave components of the EM field induced by the HED transmitter at the VED detector.

14 Claims, 5 Drawing Sheets

ELECTROMAGNETIC SURVEYING FOR HYDROCARBON RESERVOIRS

This application is a continuation of U.S. patent application Ser. No. 10/554,236, filed Oct. 20, 2005, now U.S. Pat. No. 7,659,721 which is a national phase of International Application No. PCT/GB2004/001877 filed Apr. 30, 2004.

BACKGROUND OF THE INVENTION

The invention relates to seafloor electromagnetic surveying for oil and other hydrocarbon reserves.

Determining the response of subterranean strata within the earth's crust to electromagnetic fields is a valuable tool in the field of geophysical research. The geological structures associated with thermally, hydrothermally, tectonically or magmatically active regions can be studied. In addition, electromagnetic surveying, or sounding, techniques can provide valuable insights into the nature, and particularly the likely hydrocarbon content, of subterranean reservoirs in the context of subterranean oil exploration and surveying.

Seismic techniques are often used during oil exploration to identify the existence, location and extent of reservoirs in subterranean rock strata. Whilst seismic surveying is able to identify such structures, the technique is often unable to distinguish between the different possible compositions of pore fluids within them, especially for pore fluids which have similar mechanical properties. In the field of oil exploration, it is necessary to determine whether a previously identified reservoir contains hydrocarbons or just aqueous pore fluids. To do this, an exploratory well is drilled to determine the contents of the reservoir. However, this is an expensive process, and one which provides no guarantee of reward.

Whilst hydrocarbon-filled and water-filled reservoirs are mechanically similar, they do possess significantly different electrical properties and these provide for the possibility of electromagnetic based discrimination testing.

A known technique for electromagnetic probing of subterranean rock strata is the passive magneto-telluric (MT) method. Signals measured by a surface-based electromagnetic receiver in response to electromagnetic (EM) fields generated naturally, such as within the earth's upper atmosphere, can provide details about the surrounding subterranean rock strata. However, MT fields excite predominantly horizontal current flows in the earth and this makes MT surveying intrinsically insensitive to the thin resistive layers typical of subterranean hydrocarbon reservoirs. Furthermore, MT data are rarely collected at the seafloor at frequencies high enough to resolve subterranean strata on scales typical of hydrocarbon reservoirs. In addition, the effect of distant coastlines can also often be seen in MT data. This increases the complexity of data interpretation. Notwithstanding these limitations, MT techniques are still useful for determining large-scale background structure in a subterranean strata configuration, even if they cannot be directly applied to surveying for subterranean hydrocarbon reservoirs [7].

Because of the different electrical properties of hydrocarbon-filled and water-filled reservoirs, measurements of electrical resistivity beneath the seafloor have traditionally played a crucial role in hydrocarbon exploration and reservoir assessment and development. In industry, subterranean resistivity data have generally been obtained almost exclusively by wire-line logging of wells. There are, though, clear advantages to developing non-invasive geophysical methods capable of providing such information from the surface or seafloor. Although such methods are unlikely to provide comparable vertical resolution to wireline logging, the vast saving in terms of avoiding the costs of drilling test wells into structures that do not contain economically recoverable amounts of hydrocarbon would represent a major economic advantage.

In research fields that are not of commercial interest, geophysical methods for mapping subterranean resistivity variations by various forms of controlled source EM surveying have been in use for many years [1, 2, 3, 10]. Proposals for finding hydrocarbon reservoirs using such EM surveying techniques have also been made [4, 5], and applications to the direct detection of hydrocarbons using horizontal electric dipole (HED) transmitters (or sources) and receivers (or detectors) have proved successful [6, 7].

Figure 1:
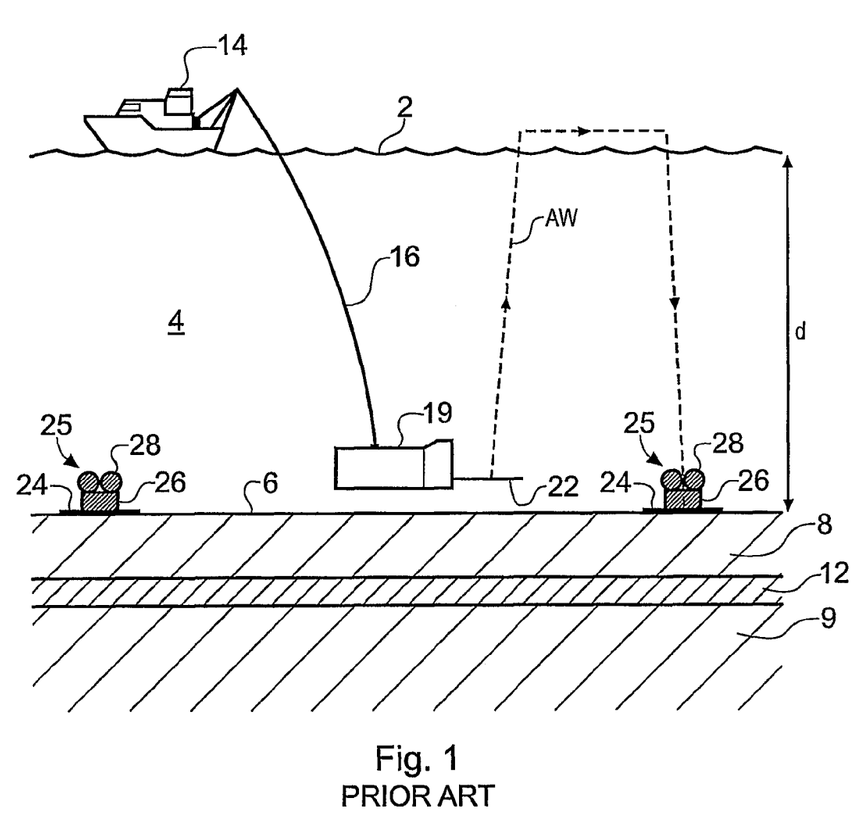
FIG. 1 shows in schematic vertical section a surface vessel undertaking an EM survey in deep water according to a previously proposed method.

FIG. 1 schematically shows a surface vessel 14 undertaking controlled source EM surveying of a subterranean strata configuration according to a previously proposed method [6]. The subterranean strata configuration includes an overburden layer 8, an underburden layer 9 and a hydrocarbon reservoir 12. The surface vessel 14 floats on the surface 2 of a body of water, in this case seawater 4 of depth d meters. A submersible vehicle 19 carrying a HED transmitter 22 is attached to the surface vessel 14 by an umbilical cable 16 providing an electrical and mechanical connection between the submersible vehicle 19 and the surface vessel 14. The HED transmitter is supplied with a drive current so that it broadcasts a HED EM signal into the seawater 4.

One or more remote receivers 25 are located on the seafloor 6. The receivers 25 include an instrument package 26, an antenna 24, a floatation device 28 and a ballast weight (not shown). The antenna 24 comprises an orthogonal pair of horizontal electric dipole detectors. The horizontal electric dipole detectors are sensitive to EM fields induced by the HED transmitter in the vicinity of the receiver 25, and produce detector signals therefrom. The instrument package 26 records the detector signals for later analysis.

The HED transmitter 22 broadcasts EM signals that propagate outwards both into the overlying water column 4 and downwards into the seafloor 6 and the underlying strata 8, 9, 12. At practical frequencies for this method and given the typical resistivity of the respective media 4, 8, 9, 12, propagation occurs by diffusion of electromagnetic fields. The rate of decay in amplitude and the phase shift of the signal are controlled both by geometric spreading and by skin depth effects. Because in general the underlying strata 8, 9, 12 are more resistive than the seawater 4, skin depths in the underlying strata 8, 9, 12 are longer. As a result, electric fields measured by a receiver located at a suitable horizontal separation are dominated by those components of the transmitter EM signal which have propagated downwards through the seafloor 6, along within the underlying strata 8, 9, 12, and back up to the receiving antenna 24. Both the amplitude and the phase of the received signal depend on the resistivity structure of the underlying strata 8, 9, 12. Accordingly, a survey built up from many transmitter and receiver locations can provide a multi-dimensional image, by geophysical inversion, of subterranean resistivity. Because hydrocarbon reservoirs have relatively high resistivities (typically 100 $\Omega$m) compared to other subterranean strata (typically 1 $\Omega$m), they can be easily identified in maps of subterranean resistivity.

However, a significant problem with controlled source EM surveying techniques of the kind shown in FIG. 1 is that they do not work well in shallow water due to the presence of an 'air-wave' component in the EM fields induced by the HED transmitter at the receiver. This air-wave component is due to EM signals from the HED transmitter which follow a propagation path upwards through the seawater to the surface;

horizontally through the air; and back down through the water column to the receiver. The air-wave component contains very little information about subterranean resistivity. Accordingly, if the air-wave contributes a significant component to the EM fields induced by the HED transmitter at the receiver, the sensitivity of the technique to subterranean resistivity structures, such as hydrocarbon reservoirs, is greatly reduced. The path of an example air-wave component is shown in FIG. 1 by a dotted line labelled AW. The magnitude of the air-wave component is not significantly reduced by its passage through air. This is because air is non-conducting. However, as with other components, the airwave component is strongly attenuated by its passage through the seawater. This means that in relatively deep water (large d) the air-wave component is not very significant at the receiver and as such does not present a major problem. However in shallow water (small d) the air-wave component does not pass through as much seawater and thus makes a larger contribution to the EM fields induced by the HED transmitter at the receiver. This contribution becomes greater still at increasing transmitter-receiver horizontal separations. This is because (other than due to geometric spreading) the strength of the air-wave component is relatively constant over a wide range of horizontal separations since any extra distance traveled by the air-wave component is almost exclusively in the non-attenuating air. Other components of the EM fields induced by the HED at the receiver, such as those which pass through the subterranean strata and are of interest, travel through lower resistivity media and become increasing attenuated as they travel further. For these reasons, the air-wave component tends to dominate the EM fields induced by the HED transmitter at the receiver for surveys made in shallow water, especially at long transmitter-receiver horizontal separations.

The existence of the air-wave as a dominant component of the detector signals limits the applicability of the above described surveying technique. In shallow water the range of transmitter-receiver over which the technique can be applied is much reduced. This not only leads to a need to employ more receiver locations to adequately cover a given area, but also limits the depth beneath the seafloor to which the technique is sensitive. This can mean that a buried hydrocarbon reservoir in shallow water may not be detectable, even though the same reservoir would be detected in deeper water.

Figure 2:
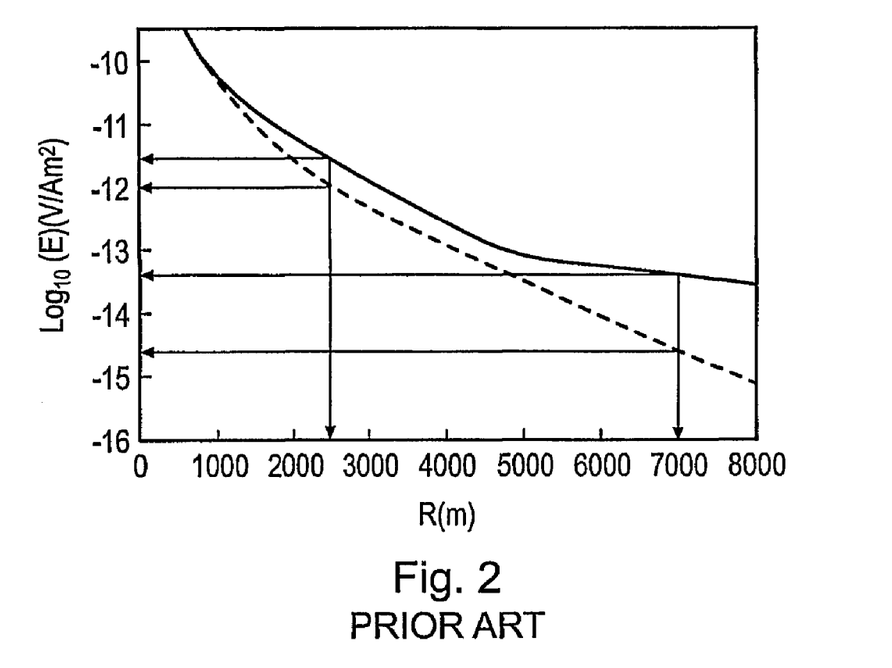
FIG. 2 is a graph plotting detector signals calculated from two model surveys made according to the previously proposed method, one performed in deep water (dotted line) and one performed in shallow water (solid line)

FIG. 2 is a graph schematically showing results of one-dimensional modelling of two example EM surveys of the kind shown in FIG. 1. One example corresponds to a survey performed in deep water (dotted line) and the other to a survey performed in shallow water (solid line). For each model survey the amplitude of an electric field component induced at the receiver in response to the HED EM transmitter is calculated per unit transmitter dipole and is plotted as a function of horizontal separation R between the HED transmitter and the receiver. For both model surveys, the subterranean strata configuration is a semi-infinite homogeneous half space of resistivity 1 $\Omega$m. In the deep-water example, the subterranean strata configuration is located beneath an infinite extent of seawater. In the shallow-water example, it is located beneath a 500-meter depth of seawater. In both cases the seawater has resistivity 0.3 $\Omega$m. The transmitter and receiver are separated along a line which runs through the axis of the HED transmitter. It is the component of detected electric field resolved along this direction which is plotted in FIG. 2. The HED transmitter is driven by a quasi-square wave AC current at a frequency of 0.25 Hz.

Figure 3:
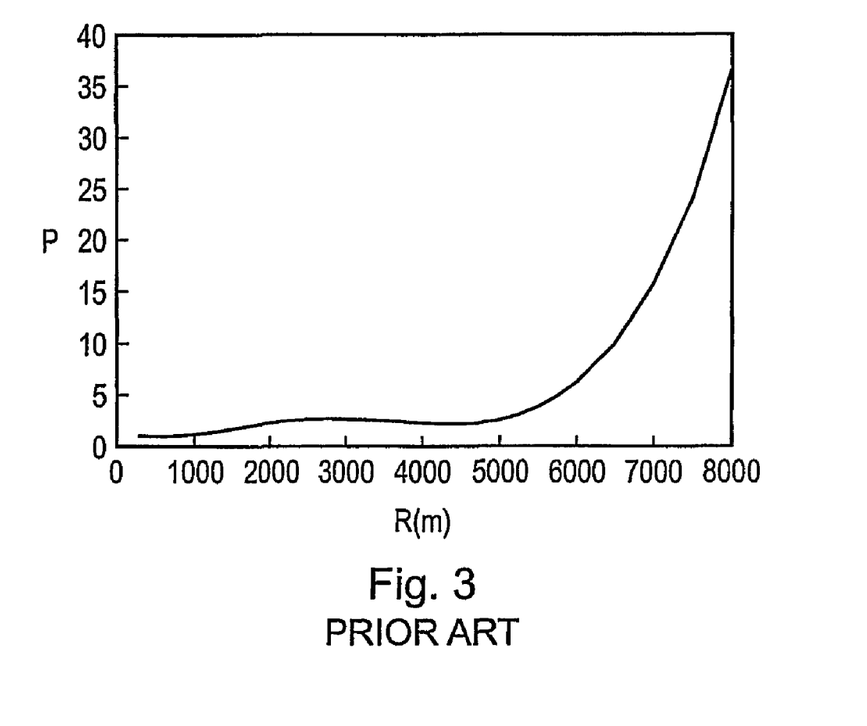
FIG. 3 is a graph plotting the ratio of the two curves shown in FIG. 2.

The effect of the air-wave component on the amplitude of EM fields induced by the HED transmitter at the receiver is clear. In the deep-water model survey, where there is no air-wave component, the calculated electric field amplitude falls steadily with increasing horizontal separation. In the shallow-water model, however, where there is a strong air-wave component, the rate of amplitude reduction sharply reduces at a transmitter-receiver horizontal separation of about 5000 m. FIG. 3 is a plot showing the ratio, p, of the two curves shown in FIG. 2, and the large deviations from unity highlight the difference between these curves. Since the only difference between the two model surveys is the presence or not of an air-wave component, the ratio plotted in FIG. 3 effectively shows the relative strength of the air-wave component in the detected signal compared to that which passes through the subterranean strata for the shallow-water model survey.

It is apparent from FIGS. 2 and 3 that at all but the very shortest horizontal separations the detected electric field is significantly larger in the shallow-water model. For example, at a horizontal separation of 2500 m, the amplitude of the detected signal in the deep-water model survey is around $10^{-12}$ Am$^{-2}$. In the shallow-water model survey it is higher at around $10^{-11.5}$ Am$^{-2}$. This is due to the additional contributions of the air-wave component. This level of increase shows that the air-wave component is over twice as strong as the component which has passed through the subterranean strata, and accordingly over two-thirds of the detector signal carries almost no information about the subterranean strata. At greater horizontal separations the air-wave component dominates even more. In particular, it becomes especially pronounced beyond around 5000 m. At this point there is a break in the rate at which the detected electric field amplitude falls with increasing horizontal separation. At a horizontal separation of around 7000 m, the air-wave component in the shallow water example is around twenty times stronger than that which passes through the subterranean strata. This clearly imposes high requirements for the signal-to-noise ratio of data collected over these sorts of horizontal separations, as is generally the case when a small signal rides on a large background. It is apparent that the air-wave significantly limits the usefulness of these surveying techniques in shallow water.

In addition to the problems associated with the air-wave component, practical EM surveys of the kind shown in FIG. 1 are subject to several other limitations. These limitations arise because of the need to carefully consider the orientation of the current flows induced by EM signals [6]. The response of seawater and subterranean strata (which will typically comprise planar horizontal layers) to EM signals is generally very different for horizontally and vertically flowing current components. For horizontally flowing current components, the coupling between the layers comprising the subterranean strata is largely inductive. This means the presence of thin resistive layers (which are indicative of hydrocarbon reservoirs) do not significantly affect the EM fields detected at the surface since the large scale current flow pattern is not affected by the thin layer. On the other hand, for vertical current flow components, the coupling between layers is largely galvanic (i.e. due to the direct transfer of charge). In these cases even a thin resistive layer strongly affects the EM fields detected at the surface since the large scale current flow pattern is interrupted by the resistive layer. It is known therefore that vertical current loop components of induced current are required to satisfactorily perform an EM survey in the field of oil exploration.

However, sole reliance on the sensitivity of vertical current flow components to the presence of a thin resistive layer can lead to ambiguities. The effects on detected EM fields arising from the presence a thin resistive layer can be indistinguishable from the effects arising from other realistic large scale subterranean strata configurations. In order to resolve these ambiguities using known survey techniques it is necessary to determine the response of the subterranean strata to both horizontal (i.e. inductively coupled) and vertical (i.e. galvanically coupled) induced current flows [6].

Hence it is important when designing a practical EM survey of the kind described above to distinguish between transmitter and receiver configurations in which the coupling between layers is largely inductive due to horizontal currents (in which case the survey has little sensitivity to the presence of a thin reservoir) and those in which the coupling between layers is largely galvanic due to vertical currents (in which case blocking of the passage of this current flow by a reservoir leads to a survey which is strongly sensitive to the presence and boundary of hydrocarbon within the reservoir).

The HED transmitter 22 shown in FIG. 1 generates both inductive and galvanic current flow modes with the relative strength of each mode depending on HED transmitter-receiver geometry. At receiver locations which are broadside to the HED transmitter axis, the inductive mode dominates the response. At receiver locations which are in-line with the HED transmitter axis, the galvanic mode is stronger [6, 8, 9, 10]. The response at receiver locations in both the in-line and broadside configurations is governed by a combination of the inductively and galvanically coupled modes and these tend to work in opposition.

Figure 4:
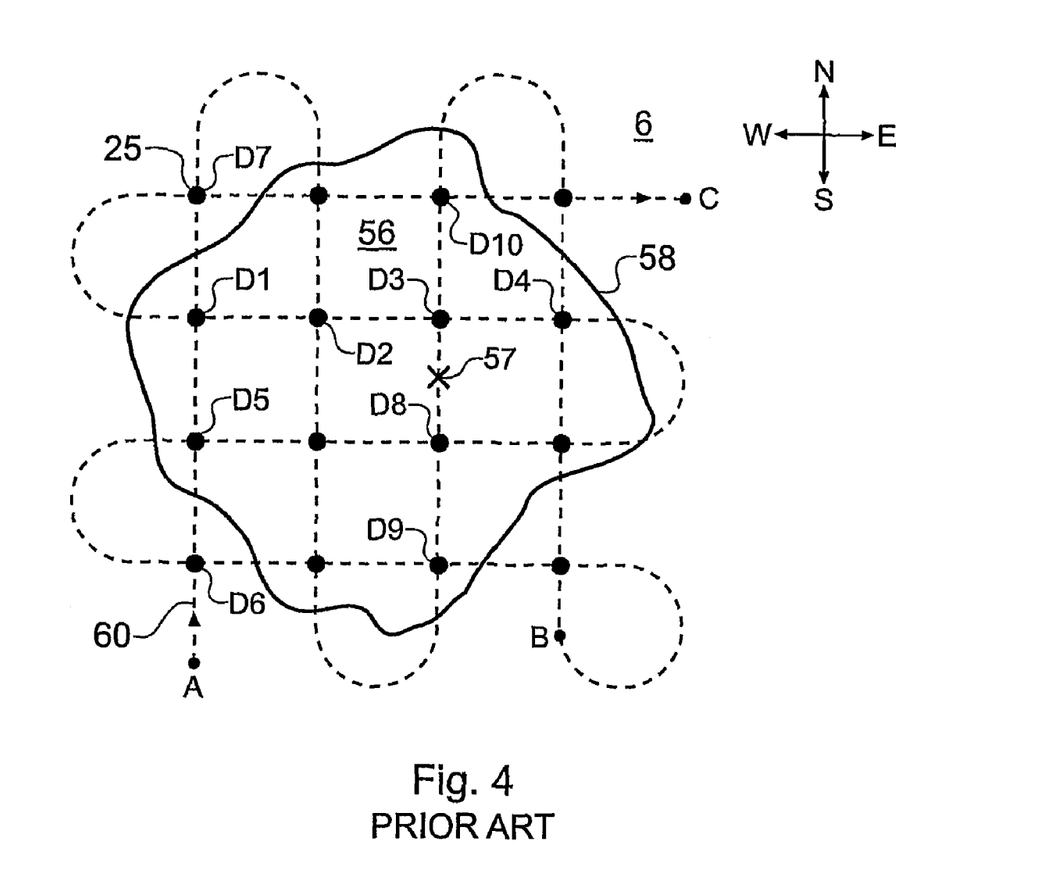
FIG. 4 is a schematic plan view showing an example survey geometry according to the previously proposed method in which sixteen detectors are laid out on a section of seafloor above a subterranean reservoir.

FIG. 4 shows in plan view an example survey geometry according to the above described survey method in which sixteen receivers 25 are laid out in a square grid on a section of seafloor 6 above a subterranean reservoir 56 having a boundary indicated by a heavy line 58. The orientation of the subterranean reservoir is indicated by the cardinal compass points (marked N, E, S and W for North, East, South and West respectively) indicated in the upper right of the figure. To perform a survey, a transmitter starts from location 'A' and is towed along a path indicated by the broken line 60 through location 'B' until it reaches location 'C' which marks the end of the survey path. As is evident, the tow path first covers four parallel paths aligned with the North-South direction to drive over the four "columns" of the receivers. This part of the survey path moves from location 'A' to 'B'. Starting from location 'B', the survey path then covers four paths aligned with the East-West direction which drive over the four "rows" of receivers. Each receiver is thus driven over in two orthogonal directions. The survey is completed when the transmitter reaches the location marked 'C'.

During the towing process, each of the receivers 25 presents several different orientation geometries with respect to the transmitter. For example, when the transmitter is directly above the receiver position D1 and on the North-South aligned section of the tow path, the receivers at positions D5, D6 and D7 are at different ranges in an end-on position, the receivers at positions D2, D3 and D4 are at different horizontal separations in a broadside position and the receiver at positions D8 and D9 are in-between. However, when the transmitter later passes over the receiver position D1 when on the East-West aligned section of the tow path, the receivers at positions D5, D6 and D7 are now in a broadside position, and the receivers at position D2, D3 and D4 are in an end-on position. Thus, in the course of a survey, and in conjunction with the positional information of the transmitter, data from the receivers can be used to provide details of the signal transmission through the subterranean strata for a comprehensive range of distances and orientations between transmitter and receiver, each with varying galvanic and inductive contributions to the signal propagation. In this way a simple continuous towing of the transmitter can provide a detailed survey which covers the extent of the subterranean reservoir.

While this survey method has been demonstrated to provide good results in practice, as noted above some limitations have been identified.

Firstly, since the inductive and galvanic modes cannot be easily separated there will generally be a level of cross-talk between them at a receiver. This may lead to ambiguities in the results.

Secondly, in order to obtain survey data from both in-line and broadside geometries, the HED transmitter needs to be re-oriented at each HED transmitter survey location. This requires the surface vessel to make multiple passes over broadcast locations and can lead to complex and long tow patterns.

Thirdly, a HED transmitter based EM survey can only provide the best data possible at discrete survey locations. This is because of the geometric requirements of a HED transmitter survey which dictate that, at any point during the survey, data can only be optimally collected from those receivers to which the HED transmitter is arranged either in-line or broadside. At other orientations, horizontal separation of the inductively and galvanically coupled signals becomes much more difficult and data are less reliable. For instance, referring to FIG. 4, when the HED transmitter is at a point on the tow path above the receiver marked D1 and on the North-South aligned section of the tow path, in-line data can only be collected from the receivers marked D5, D6 and D7, whilst broadside data can only be collected form the receivers marked D2, D3 and D4. The other receivers provide only marginally useful information at this point of the survey. Furthermore, if the HED transmitter is at the location identified by reference numeral 57 in FIG. 4, which is on a North-South aligned section of the tow path, in-line data can be collected from the receivers marked D3, D8, D9 and D10, but broadside data cannot be collected from any of the receivers. Since both broadside and in-line data are required for optimal analysis, the best data possible with the square receiver array shown in FIG. 4 can only be collected from points along the tow path directly above the receiver locations.

SUMMARY OF THE INVENTION

According to a first aspect of the invention there is provided a method of analysing results from an electromagnetic survey of an area that is thought or known to contain a subterranean hydrocarbon reservoir, comprising: providing vertical electric dipole (VED) response data obtained by at least one VED detector detecting a signal from a horizontal electric dipole (HED) transmitter; providing background data specific to the area being surveyed; and comparing the VED response data with the background data to obtain difference data sensitive to the presence of a subterranean hydrocarbon reservoir.

In this case, references to vertical and horizontal indicate that a significant component, preferably a major component, of the respective signals should be aligned with the vertical and horizontal axes. It is not necessary that the signals are perfectly, or even closely, aligned to the vertical and horizontal axes, although fairly close alignment is preferred to provide a strong signal and reduce the complexity of analysis, for example alignment within +/−30° is desirable.

By using VED response data in the analysis, it is possible to analyse survey results taken in shallower water than has previously been possible. This is because the VED response data are not sensitive to detected signal components which have propagated through air and which tend to dominate survey results obtained with previous methods. In addition, because the VED response data are not sensitive to horizontal current flows, there is no mixing between galvanic and inductive modes in the VED response data. This means a complete survey can be carried out with a single tow. In contrast, in previously proposed EM survey methods based on use of HED detectors, two sets of survey data had to be obtained with different tows over different paths in order to probe the response of an area of interest galvanically and inductively.

The comparison of VED response data with background data makes it possible to determine whether features of the VED response data are indicative of a hydrocarbon reservoir or arise as a result of some other local background structure configuration. Background data may be obtained by modelling the EM survey performed to obtain the VED response data with a model background subterranean strata configuration. The background model strata configuration should preferably be a close match to the actual background structure in the area being surveyed.

The background data may be obtained in several ways, for example from a controlled source electromagnetic survey, from a magneto-telluric electromagnetic survey, from another similar survey taken at a different time, or from a rock formation model. If a rock formation model is used it should preferably include resistivity, and may be derived from a combination of geological data and resistivity data. The geological data can be from seismological surveying and the resistivity data from well logging. Other sources of information, such as neutron data or other porosity estimates from well logs, could also be used.

The difference data may represent the difference between the VED response data and the background data as a function of position within the area, and the analysis may include identifying a location of a boundary of a subterranean hydrocarbon reservoir.

According to a second aspect of the invention there is provided a computer program product bearing machine readable instructions for implementing a method of analysing results from an electromagnetic survey according to the first aspect of the invention.

According to a third aspect of the invention there is provided a computer apparatus loaded with machine readable instructions for implementing the method of analysing results from an electromagnetic survey according to the first aspect of the invention.

According to a fourth aspect of the invention there is provided an electromagnetic survey method applied to an area that is thought or known to contain a subterranean hydrocarbon reservoir, the area comprising subterranean strata beneath a seafloor, the method comprising: deploying at or above the seafloor a horizontal electric dipole (HED) transmitter and at least one receiver, the receiver including a vertical electric dipole (VED) detector; and collecting from the at least one VED detector VED response data induced by the HED transmitter.

An electromagnetic survey method of this type is well suited to providing VED response data for use in analysing results from an electromagnetic survey according to the first aspect of the invention.

The VED detector may consist of a single vertically aligned antenna. In another embodiment, three antennae can be used, one vertical two horizontal, each ideally being orthogonal to each other. However, as long as the two horizontal antennae are generally in crossed alignment, and extending in different horizontal directions, this will be sufficient.

According to a fifth aspect of the invention there is provided a method of planning an electromagnetic survey of an area that is thought or known to contain a subterranean hydrocarbon reservoir, comprising: creating a model of the area to be surveyed including a rock formation containing a postulated hydrocarbon reservoir, and a body of water above the rock formation; setting values for water depth, depth of the postulated hydrocarbon reservoir, and resistivity structure of the rock formation; and performing a simulation of an electromagnetic survey in the model of the survey area by calculating vertical electric dipole (VED) response data obtained by at least one simulated VED detector detecting a signal from a simulated horizontal electric dipole (HED) transmitter; and adjusting the model to remove the postulated hydrocarbon reservoir and repeating the simulation to obtain background data for comparison with the VED response data.

Repeated simulations for a number of transmitter-receiver horizontal separations and frequencies of signal can be performed in order to allow optimum surveying conditions in terms of transmitter-to-detector distance and frequency of EM signal for probing the hydrocarbon reservoir to be selected when performing an electromagnetic survey. The effects and usefulness of differing detector array configurations and transmitter tow paths can also be modelled.

According to a sixth aspect of the invention there is provided a computer program product bearing machine readable instructions for implementing the method of planning an electromagnetic survey according to the fifth aspect of the invention.

According to a seventh aspect of the invention there is provided a computer apparatus loaded with machine readable instructions for implementing the method of planning an electromagnetic survey according to the fifth aspect of the invention.

BRIEF DESCRIPTION OF THE DRAWINGS

For a better understanding of the invention and to show how the same may be carried into effect reference is now made by way of example to the accompanying drawings, in which.

DETAILED DESCRIPTION

Figure 5:
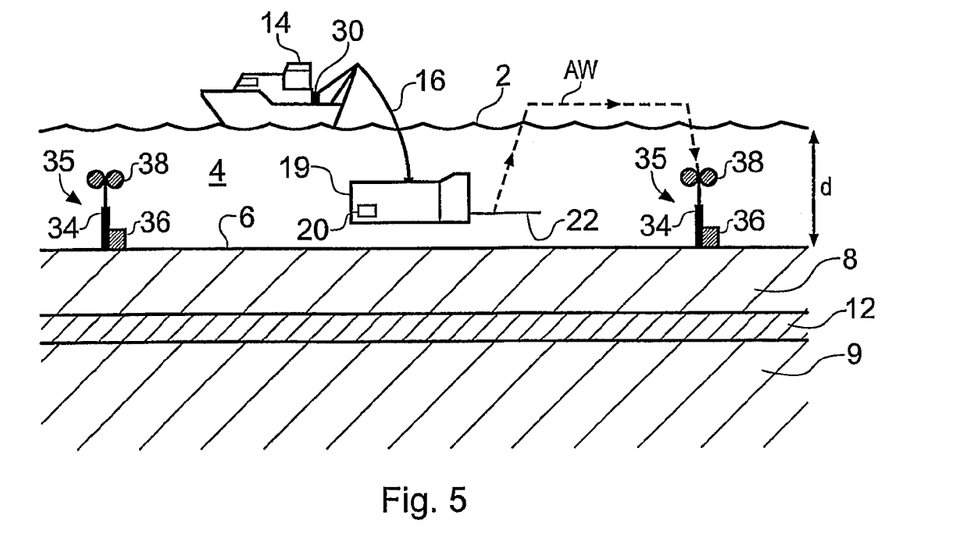
FIG. 5 shows in schematic vertical section a surface vessel undertaking an EM survey in shallow water according to an embodiment of the invention.

FIG. 5 of the accompanying drawings schematically shows a surface vessel 14 undertaking electromagnetic (EM) surveying of a subterranean strata configuration (or rock formation) according to an embodiment of the invention. Features shown in FIG. 5 which are functionally similar to features shown in FIG. 1 are given the same reference numeral. The subterranean strata configuration includes an overburden layer 8, an underburden layer 9 and a hydrocarbon reservoir 12. The surface vessel 14 floats on the surface 2 of the sea 4. A submersible vehicle 19 is attached to the surface vessel 14 by an umbilical cable 16 which provides an electrical, optical and mechanical connection between the submersible vehicle 19 and the surface vessel 14. The submersible vehicle 19 is towed by the surface vessel 14 such that it remains consistently close to the seafloor 6. This is facilitated by an echo-location package 20 which relays information about the height of the towed vehicle 19 above the seafloor 6 to the surface vessel 14. The towed vehicle 19 receives electrical power from the ship's on-board power supply via the umbilical cable 16.

A waveform generator in the form of a cycloconverter unit 30 generates a selected waveform for an alternating current (AC) drive current. The AC drive current is supplied to a horizontal electric dipole (HED) transmitter 22 which is towed by the submersible vehicle 19. Whilst in this example a cycloconverter is used, any waveform generator capable of generating a suitable output signal may be employed. Furthermore, although in this example the waveform generator is aboard the ship, in other examples the waveform generator may be on the towed vehicle. In these cases it may be supplied with electrical power from the surface vessel's power supply. The supply of the AC drive current to the HED transmitter causes it to broadcast a HED EM signal into the sea 4.

One or more remote receivers 35 are located on the seafloor 6. The receivers 35 comprise an instrument package 36, an antenna 34, a floatation device 38 and a ballast weight (not shown). The antenna 34 comprises a vertical electric dipole (VED) detector and two mutually orthogonal horizontal electric dipole (HED) detectors. A standard marine compass may be included in the instrument package to record the orientation of the HED detectors. In other examples, only the VED detector is included (i.e. the HED detector pair is omitted). The VED detector is sensitive to vertical electric components of the EM fields induced by the HED transmitter in the vicinity of the receiver 35 and may be a simple VED antenna. The VED dipole produces detector signals forming VED response data. The instrument package 36 records the VED response data for later analysis. At the end of a survey, a remotely operable release system allows the instrument package 36 to be detached from the ballast weight so that the floatation device 38 can carry the instrument package to the surface for recovery and retrieval of the VED response data for analysis.

The vertical components of the EM fields induced by the HED transmitter at the detector are significantly weaker than the horizontal components. This is perhaps one reason why recent development of electromagnetic surveying for detecting hydrocarbon reservoirs has been focussed around use of HED receivers. However, in using a VED detector to obtain VED response data as taught by the invention, surveys which are far less sensitive to the air-wave component can be performed. This is because the air-wave component is strongly biased towards inducing horizontal currents at the detector. The component of the air-wave which would induce vertical currents at the detector is highly inefficiently coupled across the horizontal interface between the air and the seawater. Because the air-wave component is unable to dominate the VED response data, the proposed survey technique is able to operate in water which is much shallower water than previously described methods.

Figure 6:
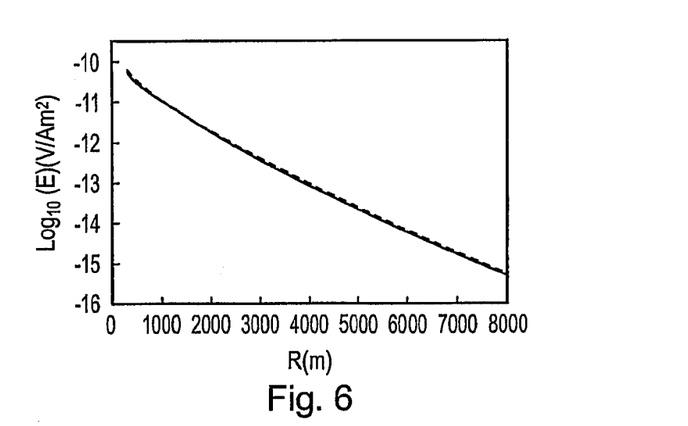
FIG. 6 is a graph plotting detector signals calculated from two model surveys made according to the embodiment of the invention, one performed in deep water (dotted line) and one performed in shallow water (solid line)

FIG. 6 is a graph schematically showing results of one-dimensional modelling of two example EM surveys of the kind shown in FIG. 5. FIG. 6 is to be compared with FIG. 2 showing results of modelling of previously known EM surveys. Again, one example in FIG. 6 corresponds to a survey performed in deep water (dotted line) and the other to a survey performed in shallow water (solid line). Unlike FIG. 2, it is the amplitude of the vertical electric field component induced at the receiver in response to the HED transmitter calculated per unit transmitter dipole which is plotted as a function of transmitter-receiver horizontal separation R in FIG. 6. For both the deep-water and the shallow-water model surveys the subterranean strata configuration is again a semi-infinite homogenous half space of resistivity 1 $\Omega$m. As before, in the deep-water model survey the seawater is of infinite extent, and in the shallow-water model survey it is of depth 500 meters. In both cases the seawater has resistivity 0.3 $\Omega$m. The transmitter and receiver are again separated along a line which runs through the axis of the HED transmitter and the HED transmitter is driven by a quasi-square wave AC current at a frequency of 0.25 Hz.

Figure 7:
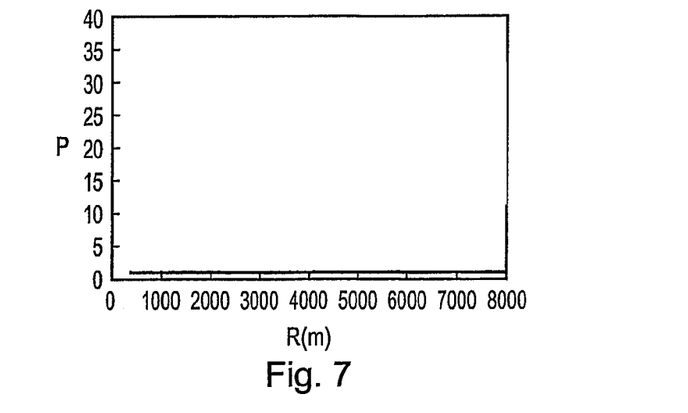
FIG. 7 is a graph plotting the ratio of the two curves shown in FIG. 6.

It is apparent from FIG. 6 that in using the survey technique of the invention, the effect of the air-wave component on the amplitude of EM fields induced by the HED transmitter at the receiver is minimal. In both the deep-water model survey, where there is no air-wave component, and the shallow water model survey, where there is an air-wave component, the calculated electric field amplitudes are very similar. FIG. 7 is a plot showing the ratio, p, of the two curves shown in FIG. 6. FIG. 7 is to be compared with FIG. 3 and is plotted on the same scale to allow direct comparison. The similarity of the VED response data calculated for both the deep-water and shallow-water model surveys is apparent from the curve in FIG. 7 being close to unity for all horizontal separations. A comparison of FIG. 7 with FIG. 3 provides a clear demonstration of the improved EM survey performance obtainable in shallow water using the new survey technique.

In the example shown in FIG. 5, the VED detector is rigidly attached to the remainder of the receiver structure. This is to prevent the VED detector moving in response to undersea water currents. Motion of the VED detector would otherwise introduce noise into the VED response data, for example from currents induced by its motion in the Earth's magnetic field. Because the VED detector is rigidly attached to the remainder of the receiver, it may not always be correctly vertically aligned. This would be the case, for example, if the receiver was deployed on a sloping surface. To account for this, and to ensure the vertical component of the EM fields induced by the HED transmitter at the detector are properly measured, the instrument package preferably includes a clinometer so that the detector signals can be properly resolved into their vertical and horizontal components. In another example, a naturally buoyant VED detector may be employed. This could, for example, be provided by a dipole detector pivotably attached to the remainder of the receiver at one end and having a buoyancy aid attached to the other end. A clinometer may again be included to allow detector signals to be properly resolved. Such an arrangement would ensure that the dipole detector is vertically aligned irrespective of the orientation of the remainder of the receiver. However, as noted above, this would make the VED detector sensitive to motionally induced noise. This could be reduced, for example, by employing a clamping mechanism to rigidly hold the pivotably attached dipole detector once it has settled in a vertical alignment following initial deployment.

The characteristics of the modelled VED response data shown in FIG. 6 are specific to the subterranean strata configuration employed in the model surveys. In both cases, this is a semi-infinite homogeneous structure with a resistivity of 1 Ωm. If the subterranean strata configuration were different, calculated curves corresponding to those of FIG. 6 would also be different. For example, if there were a hydrocarbon reservoir embedded within the subterranean strata configuration, such as the one schematically shown in FIG. 5, the detected electric field amplitudes would be higher. This is due to the lower attenuation experienced by the components of the EM signal from the HED transmitter which travel through the higher resistivity hydrocarbon reservoir. The magnitude of the increase in signal due to a hydrocarbon reservoir is likely to be different at different transmitter-receiver horizontal separations R. This is because the signal propagation between the HED transmitter and the VED detector is weighted by depth as a function of horizontal separation between the HED transmitter and the VED detector. For example, if the HED transmitter and the VED detector are close compared to the depth of a buried hydrocarbon reservoir, effects of signals propagating through the hydrocarbon reservoir will be small since the detector signals will be dominated by signals which have propagated through the overburden layers. However, at larger horizontal separations, the effects of the hydrocarbon reservoir will become more pronounced. It is these types of effect which make the technique described above sensitive to the presence of hydrocarbon reservoirs.

Because in practice, subterranean strata configurations are not as simple as those used in the model surveys described above, it is often difficult to identify directly from curves of the type shown in FIG. 6 which have been obtained from real surveys whether the curves contain features indicative of a buried hydrocarbon reservoir or merely features relating to local larger scale background structures. In particular the kind of VED response data seen with a thin resistive hydrocarbon reservoir embedded in a uniform resistivity background is similar to that seen in a subterranean strata configuration comprising layers of increasing resistivity with depth. This kind of increasing-resistivity structure is a feature of some submarine sedimentary basins and can arise due to the progressive expulsion of conductive pore fluids with increasing depths by a rising overburden pressure. Accordingly knowledge of the large scale background structure of the subterranean strata in the area to be surveyed is often needed in order to determine reliably whether features in VED response data are caused by a buried hydrocarbon layer or whether they are caused by large scale background structures.

A survey aimed at establishing whether a subterranean strata configuration contains a thin resistive hydrocarbon reservoir will normally involve obtaining VED response data, of the type plotted in FIG. 6, using the technique shown in FIG. 5. These VED response data are sensitive to the presence of subterranean hydrocarbon reservoirs. However, in addition, to determine reliably whether features of the VED response data are indicative of a hydrocarbon reservoir or of the local background structure, it is necessary to determine how the VED response data for a given subterranean strata configuration would appear if there were no hydrocarbon reservoir.

This analysis step, generally referred to as normalisation, is usually done with the aid of background data. Background data are specific to the area being surveyed and can be obtained in a variety of ways. One way is to model the EM survey performed to obtain the VED response data with a model background subterranean strata configuration. The background model should be as close a match as possible to the actual background structure in the area being surveyed. A comparison of the VED response data with the background data provides difference data sensitive to the likely presence, extent and location of a subterranean hydrocarbon reservoir embedded within the background subterranean strata configuration. For example, if the VED response data closely match the background data, there is unlikely to be a buried hydrocarbon layer. If, on the other hand, there are differences, i.e. anomalies, in the VED response data compared to the background data, for example, an increased receiver signal amplitude, this could be analysed quantitatively assessed in terms of being indicative of a buried hydrocarbon reservoir. The variation in anomalies at different horizontal separations provides information on the depth and extent of a hydrocarbon reservoir. For example, if differences between the VED response data and the background data are only apparent at large transmitter-receiver horizontal separations, this is likely to indicate that the hydrocarbon reservoir is relatively deeply buried. Similarly, a discontinuity in VED response data as a function of horizontal separation is likely to indicate a boundary or edge of a hydrocarbon reservoir at the location of the discontinuity.

Suitable background models to use in generating background data can be obtained in several ways.

One way of obtaining the information required to construct a suitable background model is with conventional MT electromagnetic surveying techniques. As noted above, these techniques are capable of providing information on large scale background resistivity structures, even though they unable to detect hydrocarbon reservoirs directly.

Another way of obtaining the information required to construct a suitable background model is by using conventional controlled source electromagnetic surveying techniques. Whilst the use of such techniques to determine a background model is prone to the same difficulties associated with the air-wave component described above, the impact of the air-wave component can be reduced by employing relatively low frequency EM signals. Low frequency signals suffer less attenuation as they pass through the subterranean strata and so the air-wave component is not so dominant in the EM fields induced at a receiver by a HED transmitter driven by a low frequency AC current. While these low frequency signals are unlikely to provide sufficient spatial resolution to properly resolve subterranean hydrocarbon reservoirs, they are nonetheless capable of providing information on large scale background resistivity structures needed to generate a background model.

In other cases, an area to be surveyed will already be very well characterized by previous surveying. For example, in a producing oilfield or oil province there is likely to be a wealth of existing seismic and well-log data. In these cases, background models can be calculated from a rock formation model. The rock formation model can be created from the seismic data and then resistivities assigned to the various components in the rock structure using the resistivities obtained from well-log data. (If directly applicable well-log data are not available, it may be possible to estimate resistivity values by comparison with resistivity data from nearby wells in similar geological structures.) This technique for obtaining the information required to construct a suitable background model will be especially suited to applications in existing oilfields, such as monitoring long term depletion of reserves.

When monitoring depletion, it may be sufficient to directly compare VED response data taken at different times, e.g. several weeks or months apart, without use of a rock formation model. In other words, the background data used is data from a previous similar survey. Differences in VED response data taken at different times are indicative of changes in the hydrocarbon reservoir which have occurred between the times at which the data were taken. Because of this, this kind of comparison provides a useful monitoring tool. The VED response data taken at the earlier time thus effectively acts as background data for comparing with the VED response data taken at the later time.

Having described some of the types of survey results required, and the steps involved in analysing them, practical methods of performing an EM survey of an area of interest are now considered.

In order to perform a thorough survey over a large area, and to provide curves similar to those shown in FIG. 6, controlled source electromagnetic measurements will typically be made with many HED transmitter and receiver locations. Whilst these could be made in parallel using a plurality of HED transmitters operating at different frequencies and a plurality of receivers, or in series using a single HED transmitter and a single receiver which are repositioned between measurements, it will generally be more efficient to employ a plurality of receivers in fixed positions and a single HED transmitter. The HED transmitter may be mobile, as in FIG. 5, e.g. for surveying new areas, or may be static, e.g. for monitoring depletion in an existing oilfield.

The HED transmitter 22 shown in FIG. 5 can require significant power to drive it, of the order tens of kilowatts, or greater for signals detectable at horizontal separations of several kilometers. The umbilical cable 16 connecting the HED transmitter 22 to the survey vessel 14 supplies this power and makes it relatively straightforward to make the EM transmitter mobile. It can then be towed in an appropriate survey pattern by the surface vessel 14. Since in many situations surveys of this kind are liable to take place over areas of the seafloor 6 where sensitive engineering installations exist or are planned, there are significant advantages to using a transmitter which does not physically come into contact with the seafloor 6. Provided that the horizontal separation between the HED transmitter 22 and the seafloor 6 is small compared to a skin depth of the investigating field in seawater, the survey can still be performed.

As described above, an HED transmitter of the kind shown in FIG. 5 induces a combination of vertically and horizontally oriented current loops at the receivers depending on the relative transmitter-receiver orientations. It is this mode mixing which required previously proposed surveys to follow complicated tow paths of the kind shown in FIG. 4. However, since a VED detector is not sensitive to horizontal current flows, only galvanically coupled modes contribute to the VED response data. Because of this lack of mixing of the galvanically and inductively coupled modes in the VED response data, the complicated survey geometries required with previously proposed methods are not required when surveying according to the method shown in FIG. 5. There are, however, some geometrical limitations associated with the new surveying technique. This is because with a uniformly layered subterranean strata configuration, there is no vertical component in the EM fields induced by a HED transmitter at a receiver located exactly broadside to the HED transmitter. Accordingly, no signal will be received in this configuration. The angular range over which VED response data can usefully be collected will depend on the sensitivity of the VED detector, the strength of the HED transmitter and the transmitter-receiver horizontal separation. However, so long as there is a detectable vertical component to the EM fields induced by the HED transmitter at the receiver, VED response data obtained for any transmitter-receiver orientation can be used without the problems associated with mixed galvanically and inductively coupled modes.

Figure 8:
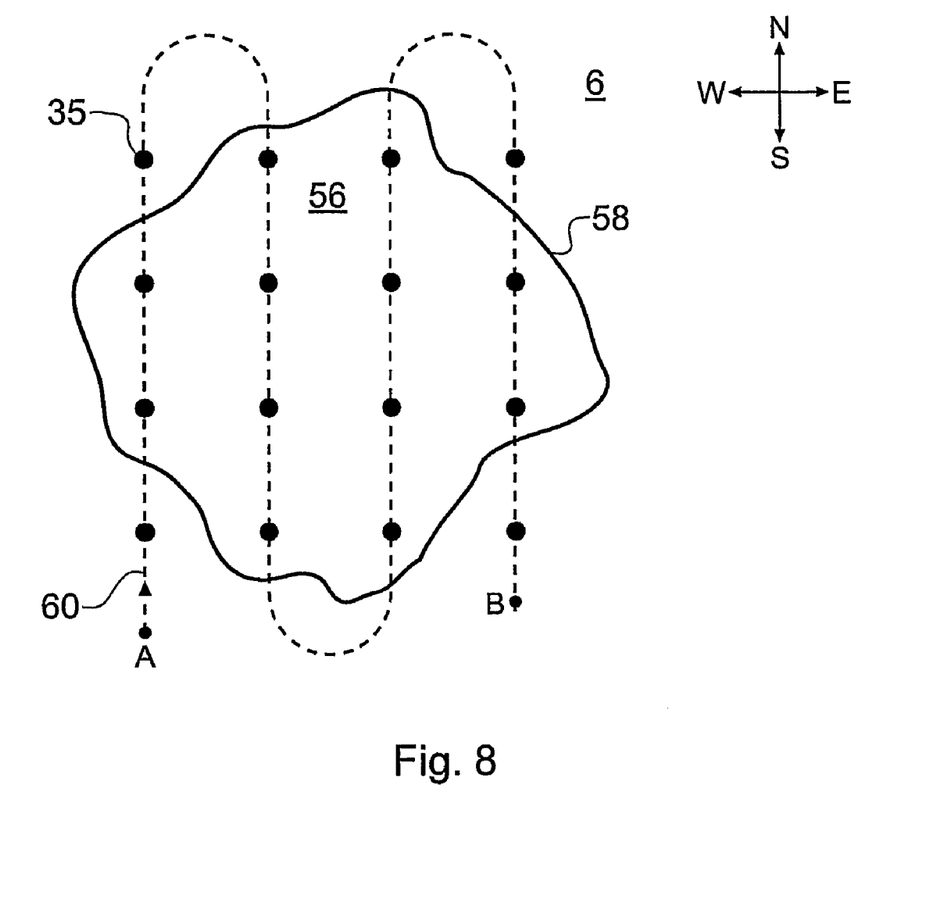
FIG. 8 is a schematic plan view showing an example survey geometry for surveying according to an embodiment of the invention in which sixteen detectors are laid out on a section of seafloor above a subterranean reservoir.

FIG. 8 is a schematic plan view showing an example layout of sixteen receivers 35 distributed across a section of seafloor 6 above subterranean reservoir 56 during a survey of the kind shown in FIG. 5. The reservoir 56 has a linear extent on the order of several km and its boundary is indicated by a heavy line 58. The reservoir is similar to the reservoir shown in FIG. 4. The orientation of the subterranean reservoir is indicated by the cardinal compass points (marked N, E, S and W for North, East, South and West respectively) indicated in the upper right of the figure. In this example, the receivers 35 are uniformly distributed in a square-grid pattern so as to approximately cover the reservoir 56. In performing the survey, a HED transmitter (not shown) starts from the location marked 'A' in FIG. 8 and is towed, whilst broadcasting continuously as described above, along a path indicated by the broken line 60. The survey is completed when the transmitter reaches the location marked 'B'. VED response data are continuously collected by the receivers 35 throughout the towing process and the position of the HED transmitter relative to the network of receivers is also logged.

During the towing process, each of the receivers 35 presents several different transmitter-receiver horizontal separations and orientations relative to the HED transmitter. Accordingly, by following the tow path marked, VED response data are collected for many different transmitter-receiver horizontal separations along many different directions. These VED response data can be inverted to provide a thorough map of the subterranean strata configuration using appropriate geophysical inversion techniques. In this way a simple continuous towing of the transmitter can provide a detailed survey which covers the extent of the subterranean reservoir 56.

As described above, FIG. 4 shows for comparison an example tow path which might be followed in performing a previously known survey of the kind shown in FIG. 1. The tow path shown in FIG. 4 is approximately twice as long as that shown in FIG. 8. Furthermore, when performing an EM survey according FIG. 8, VED response data can be collected when the HED transmitter is at all points along a tow path as long as the tow path direction is suitable.

Collecting VED response data thus allows a greater amount of useful data to be collected from a shorter tow path than the previous proposed end-on/broadside method based on collection of HED response data.

Although the above example is based on a square receiver grid, it will be understood that a wide variety of receiver placements may be used. For example other high symmetry regular grids, such as triangular or rectangular, may be used. In addition irregular grids may be used that have no high level of symmetry.

In the case of the receivers, there are further advantages in using static devices. Firstly, receivers suitable for EM survey techniques of the kind shown in FIG. 5 can be internally powered and are relatively cheap compared to HED transmitters. Because of this a plurality of receivers can easily by arrayed around an area of interest so as to provide multiple transmitter-receiver horizontal separations and positions for a single EM transmitter position, as shown in FIG. 8. Secondly, the task of the receivers is to measure electric fields at the seafloor 6. In typical applications, the signal-to-noise ratio of the detector signals is important to the success and resolution of a survey, and should be maximised. Moving a receiver inevitably generates noise. Any motion of the receiver through the conducting seawater 4 in the presence of the Earth's magnetic field generates an electromotive force across the VED detector. Receiver movements will therefore map into spurious detector signals in the VED response data.

For these reasons it is desirable to carry out a controlled source electromagnetic survey to investigate or detect the presence of buried hydrocarbons using a combination of a mobile HED transmitter operated just above the seafloor and an array of detectors placed statically on the seafloor as indicated in FIG. 8. At the end of a survey, the instrument packages associated with the receivers are recovered using an acoustically actuated release mechanism to separate it from the ballast weight, allowing them to return to the sea surface for recovery, following standard oceanographic and marine geophysical practice.

Transmitter and receiver positions can be determined using standard long and/or short and/or ultra-short baseline acoustic navigation systems and processed to determine the horizontal separation between the transmitter and receiver.

It can be seen from FIG. 8 that with the presently proposed survey technique, subterranean strata can be comprehensively surveyed with relatively few receivers and EM transmitter tows. This reduces the time taken, and hence cost, of an exploratory EM survey.

It will be understood that whilst the above description describes a towed HED transmitter, the method would also be applicable in a fixed installation. For example, the method could be used to monitor changes to a hydrocarbon reservoir from which hydrocarbon is being drawn. In such cases it will be appropriate to employ one (or more) HED transmitter(s) in fixed positions relative to a receiver array rather than undertake frequent towed surveys. The HED transmitter(s) could be anchored to the seafloor or suspended from an oil-rig platform, for example. In other examples, the HED transmitter(s) could be placed in a horizontal well or borehole, e.g. a geotechnical borehole. In the case of a producing oil field, the subterranean structures are likely to be well known already from prior geophysical surveys and drilling results. Indeed, prior geophysical and geological information from the oil field can be used to construct a background model as described above.

Finally, it will be understood that the invention is equally applicable to surveying of freshwater, for example large lakes or estuaries, so that references to seafloor, seawater etc. should not be regarded as limiting and should be interpreted as covering lakebed, riverbed etc. Indeed the applicability of the invention to shallow water makes it ideal for surveying shallow lakes.

REFERENCES

[1] Sinha, M. C., Patel, P. D., Unsworth, M. J., Owen, T. R. E. & MacCormack, M. R. G. An active transmitter electromagnetic sounding system for marine use. *Mar. Geophys. Res.*, 12, 1990, 59-68.

[2] Evans, R. L., Sinha, M. C., Constable, S. C. & Unsworth, M. J. On the electrical nature of the axial melt zone at 13° N on the East Pacific Rise. *J. Geophys. Res.*, 99, 1994, 577-588.

[3] Edwards, R. N., Law, K. L., Wolfgram, P. A., Nobes, D. C., Bone, M. N., Trigg, D. F. & DeLaurier, J. M., First result of the MOSES experiment: Sea sediment conductivity and thickness determination, Bute Inlet, Columbia, by magnetometric offshore electrical sounding, *Geophyics*, 50, 1985, 153-16.

[4] WO 00/13046 A1

[5] WO 01/57555 A1

[6] Eidesmo, T., Ellingsrud, S., MacGregor, L. M., Constable, S., Sinha, M. C., Johansen, S, Kong, F-N & Westerdahl, H., Sea Bed Logging (SBL), a new method for remote and direct identification of hydrocarbon filled layers in deepwater areas, *First Break*, 20, 2002, 144-152.

[7] Ellingsrud, S., Eidesmo, T., Johansen, S., Sinha, M. C, MacGregor, L. M. & Constable, S., Remote sensing of hydrocarbon layers by seabed logging (SBL): Results from a cruise offshore Angola, *The Leading Edge*, October 2002. 972-982.

[8] MacGregor, L. M. & Sinha, M. C. Use of marine controlled source electromagnetic sounding for sub-basalt exploration. Geophysical Prospecting, 48, 2000, 1091-1106.

[9] WO 02/14906 A1

[10] MacGregor, L. M., Constable, S. C. & Sinha, M. C. The RAMESSES experiment III: Controlled source electromagnetic sounding of the Reykjanes Ridge at 57° 45' N. *Geophysical Journal International*, 135, 1998, 773-789.

What is claimed is:

1. A method of analysing results from a combined electromagnetic and seismic survey of an area that is thought or known to contain a subterranean hydrocarbon reservoir, comprising:
   providing vertical electric dipole (VED) response data for the area obtained by at least one VED detector detecting a signal from a horizontal electric dipole (HED) transmitter;
   providing seismic data for the area;
   calculating a background model of the area from the seismic data;
   modelling an electromagnetic survey for the background model to provide background data specific to the area being surveyed; and
   comparing the VED response data with the background data to obtain difference data sensitive to the presence of a subterranean hydrocarbon reservoir.

2. A method according to claim 1, wherein the seismic data are used to identify at least one of the existence, the location and the extent of the reservoir.

3. A method according to claim 1, wherein the seismic data are pre-existing seismic data.

4. A method according to claim 1, wherein the background model is calculated from a rock formation model created from the seismic data.

5. A method according to claim 4, wherein the rock formation model comprises rock structure components with assigned resistivity values.

6. A method according to claim 5, wherein the assigned resistivity values are derived from well log data from the area or from near the area.

7. A method according to claim 1, wherein the VED response data are obtained at a first time, and the method further comprises providing further VED response data for the area obtained by at least one VED detector detecting a signal from a HED transmitter at a second time; comparing the further VED response data with the background data to obtain further difference data sensitive to the presence of the subterranean hydrocarbon reservoir; and comparing the difference data from the first and second times to provide data sensitive to changes in the hydrocarbon reservoir that have occurred between the first and second times.

8. A method according to claim 1, wherein the hydrocarbon reservoir a hydrocarbon reservoir from which hydrocarbon is being drawn.

9. A method according to claim 1, wherein the area is an oil province.

10. A combined electromagnetic and seismic survey method applied to an area that is thought or known to contain a subterranean hydrocarbon reservoir, the area comprising subterranean strata beneath a seafloor, the method comprising:

obtaining seismic data for the area;

deploying at or above the seafloor a horizontal electric dipole (HED) transmitter and at least one receiver, the receiver including a vertical electric dipole (VED) detector; and collecting from the at least one VED detector VED response data induced by the HED transmitter.

11. A method for obtaining hydrocarbon from an area that contains a subterranean hydrocarbon reservoir, comprising:

penetrating the hydrocarbon reservoir with a hydrocarbon-producing well;

providing vertical electric dipole (VED) response data for the area obtained by at least one VED detector detecting a signal from a horizontal electric dipole (HED) transmitter;

providing seismic data for the area;

calculating a background model of the area from the seismic data;

modelling an electromagnetic survey for the background model to provide background data specific to the area being surveyed;

comparing the VED response data with the background data to obtain difference data sensitive to the presence of a subterranean hydrocarbon reservoir; and continuing to extract hydrocarbon from the hydrocarbon reservoir using the hydrocarbon-producing well.

12. A volume of hydrocarbon obtained from an area that contains a subterranean hydrocarbon reservoir, the hydrocarbon obtained by:

penetrating the hydrocarbon reservoir with a hydrocarbon-producing well;

providing vertical electric dipole (VED) response data for the area obtained by at least one VED detector detecting a signal from a horizontal electric dipole (HED) transmitter;

providing seismic data for the area;

calculating a background model of the area from the seismic data;

modelling an electromagnetic survey for the background model to provide background data specific to the area being surveyed;

comparing the VED response data with the background data to obtain difference data sensitive to the presence of a subterranean hydrocarbon reservoir; and continuing to extract hydrocarbon from the hydrocarbon reservoir using the hydrocarbon-producing well.

13. A results data set representing an area that contains a subterranean hydrocarbon reservoir, the results data set obtained by:

obtaining vertical electric dipole (VED) response data for the area from by at least one VED detector detecting a signal from a horizontal electric dipole (HED) transmitter;

providing seismic data for the area;

calculating a background model of the area from the seismic data;

modelling an electromagnetic survey for the background model to provide background data specific to the area being surveyed;

comparing the VED response data with the background data to obtain difference data sensitive to the presence of a subterranean hydrocarbon reservoir; and generating the results data set based on the difference data.

14. A computer readable storage medium having a results data set according to claim 13 recorded thereon.

* * * * *